Feb. 26, 1957 R. C. MIERENDORF ET AL 2,783,375
ELECTRIC CONTROL CIRCUIT
Filed Sept. 12, 1952 2 Sheets-Sheet 1

INVENTORS.
Robert C. Mierendorf,
Clarence W. Porter.
BY
ATTORNEY.

Feb. 26, 1957 R. C. MIERENDORF ET AL 2,783,375
ELECTRIC CONTROL CIRCUIT
Filed Sept. 12, 1952 2 Sheets-Sheet 2
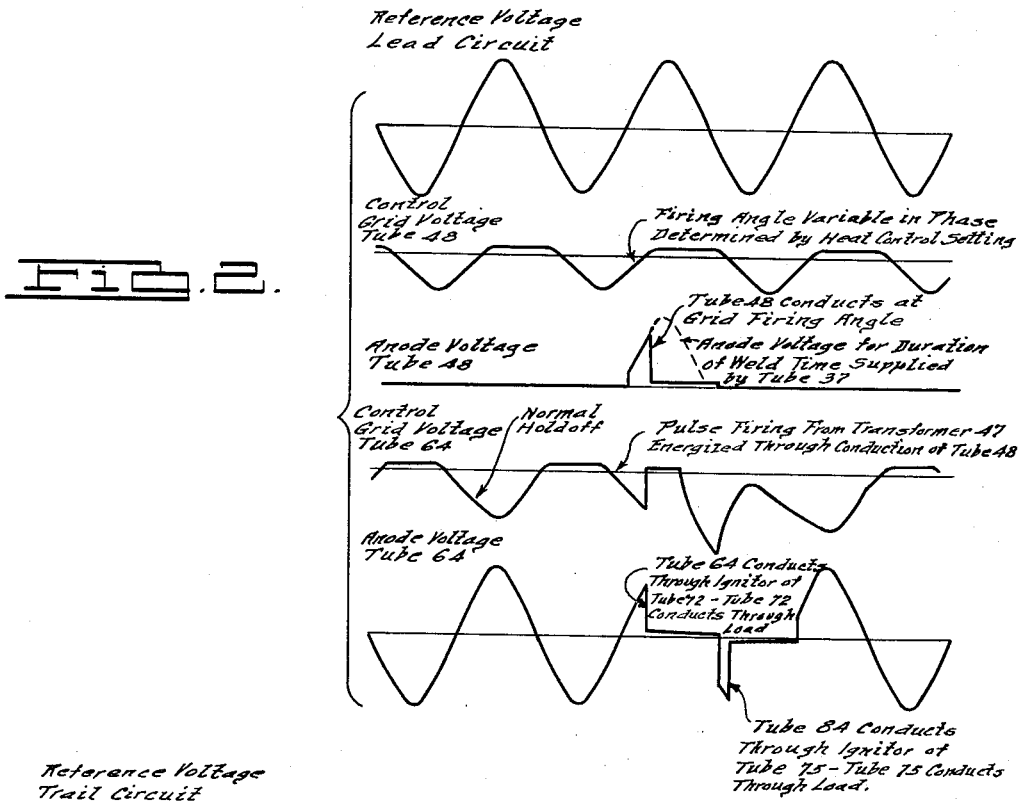
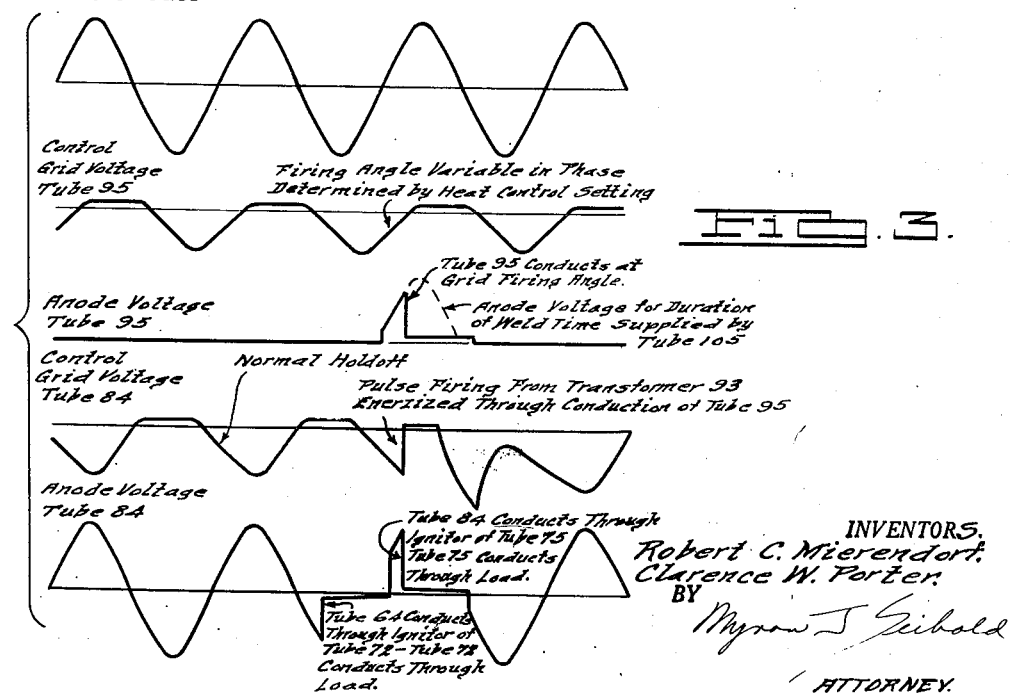
INVENTORS.
Robert C. Mierendorf.
Clarence W. Porter.
BY
Myron J. Seibold
ATTORNEY.

United States Patent Office 2,783,375
Patented Feb. 26, 1957

2,783,375

ELECTRIC CONTROL CIRCUIT

Robert C. Mierendorf and Clarence W. Porter, Milwaukee, Wis., assignors to Square D Company, Detroit, Mich., a corporation of Michigan Application September 12, 1952, Serial No. 309,284

6 Claims. (Cl. 250—27)

This invention relates to an electrical control circuit, and more particularly to an electrical circuit for effecting the electronic control of a resistance welder device.

One object of the present invention is provision of a new and improved electronic circuit for effecting precision control of a resistance welder device.

Another object of the present invention is the provision of a completely electronic control for a resistance welder device comprising a pair of back-to-back ignitrons, means being provided to ensure the passage of current through the associated welding transformer of successive half cycle pulses of welding current of opposite polarity.

Another object of the invention is the provision of a device in accordance with the preceding object in which electronic tubes of the grid controlled type are associated with the ignitrons, means being provided to effect the conduction of the control tubes for a predetermined period.

Another object of the present invention is the provision of an electronic control circuit in accordance with the preceding objects in which an ignitron is provided to control the passage of current through a welding transformer, a control tube being associated with the ignitron to control the initiation of the ignitron's induction, means being provided to drive the grid of the control tube positive and maintain that positive condition for a period sufficient to ensure conduction of the controlled ignitron.

Other objects and features of the invention will be readily apparent to those skilled in the art from the specification and appended drawings illustrating certain preferred embodiments in which:

Figure 2 shows voltage wave forms in the firing circuit for one of the ignitrons.

Figure 3 shows voltage wave forms in the firing circuit for the other of the ignitrons.

Figure 1:
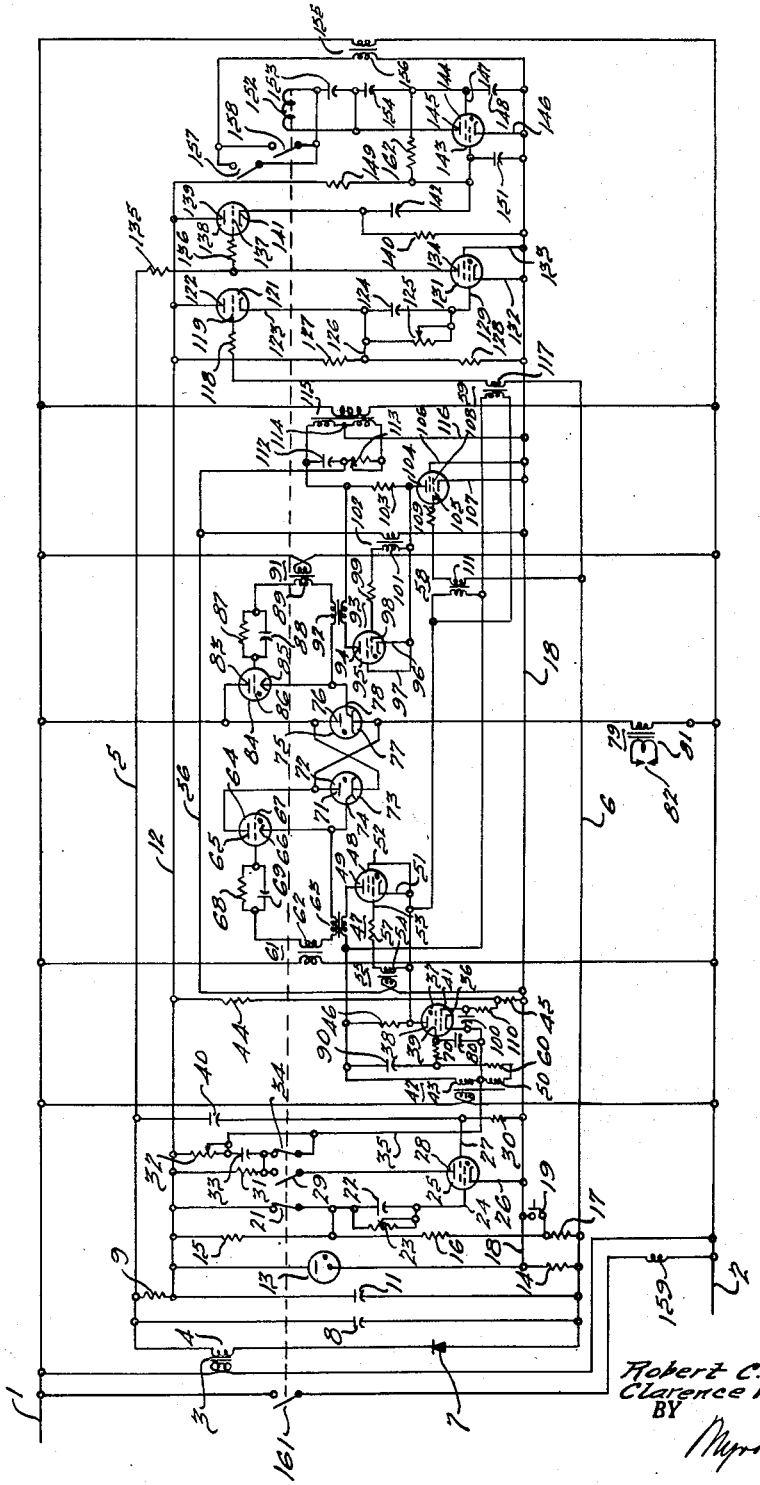
Figure 1 is a diagrammatic representation of the control circuit of the present invention.

In Figure 1 there is disclosed a pair of supply lines 1 and 2 for carrying alternating voltage to the device of the present invention. Disposed between the supply lines is a transformer 3 having a secondary winding 4 serving to supply a pair of conductors 5 and 6 through a rectifier 7. Connected between the conductors 5 and 6 is a capacitor 8, which is paralleled by a series circuit comprising a resistor 9 and another capacitor 11. To the junction point between resistor 9 and capacitor 11 is connected a conductor 12, and between conductor 12 and conductor 6 there is disposed a serial connection comprising a voltage stabilizing tube 13 and a resistor 14. Between conductor 12 and line 6 there is also disposed a group of serially connected resistors 15, 16 and 17. At the junction point between tube 13 and resistor 14, there is connected a conductor 18, the contacts 19 of a conventional pressure switch being interposed between this conductor and one terminal of the resistor 17, as illustrated in Figure 1.

Connected to the conductor 12 through a normally closed contact 21, there is a time delay circuit comprising a capacitor 22 and a variable resistor 23, this time delay circuit being connected to the control grid 24 of an electronic tube 25. Tube 25 has a cathode 26 connected to conductor 18, and has a shield grid 27 connected to an intermediate point between a resistor 30 and a capacitor 40 which are connected in series between conductors 5 and 18. Tube 25 also has an anode 28 connected through a normally open contact 29 and a resistor 31 in series therewith to the conductor 12.

Connected to conductor 12 is one end of a variable resistor 32, to the other end of which is connected a capacitor 33. In parallel with the capacitor 33 is a normally closed contact 34. The junction between resistor 32 and capacitor 33 is electrically connected by means of a conductor 35 to the cathode 36 of an electronic tube 37 having an anode 38, a control grid 41 and a shield grid 39. Anode voltage for the tube 37 is provided by a transformer 42 having its primary connected across the main supply lines 1 and 2 and having a first secondary winding 43 connected between the anode and cathode of the tube 37. Another secondary winding 50 of the transformer 42 is connected between cathode 36 and shield grid 39 of tube 37 through a resistor 60 and a grid resistor 70. A capacitor 80 is interposed between shield grid 39 and cathode 36, and a capacitor 90 is disposed between shield grid 39 and secondary winding 43 of transformer 42. A capacitor 100 interconnects cathode 36 and control grid 41, and capacitor 100 is connected through a resistor 110 to a point between two resistors 44 and 45 which are serially connected across conductors 12 and 18. In the anode circuit of tube 37, there is disposed a resistor 46 and in parallel therewith there is connected the primary winding of a transformer 47 in series with an electronic tube 48 having an anode 49, a cathode 51, a shield grid 52 and a control grid 53. Connected between the control grid 53 and the cathode 51 of the tube 48 is a secondary winding 54 of a transformer 55, the primary of which has one terminal thereof connected to the conductor 18 while the other terminal is connected to a conductor 56. A current limiting resistor 57 is disposed between the transformer secondary 54 and the control grid 53 of the tube 48.

Also in parallel with resistor 46 in the anode circuit of the tube 37 is the primary winding of a transformer 58, and the primary winding of another transformer 59.

Disposed across the main supply lines 1 and 2 is a transformer 61 having a secondary winding 62 in series with a secondary winding 63 of the transformer 47 and in the control grid circuit of an electronic tube 64. The tube 64 has an anode 65, a cathode 66 and a control grid 67. The control grid 67 of the tube 64 is connected to a parallel circuit having in one branch thereof a resistor 68 and in the other a capacitor 69. The anode 65 of tube 64 is electrically connected to the anode 71 of an ignitron 72 having a mercury pool cathode 73 and an ignitor 74 in contact therewith and connected to the cathode 66 of the tube 64. Connected in inverse parallel with the ignitron 72 is a second ignitron 75 having an anode 76 and a mercury pool cathode 77, and having an ignitor 78 disposed in contact with the cathode 77. Ignitrons 72 and 75 are connected across the main supply lines 1 and 2 through a welding transformer 79 having a secondary winding 81 connected to welding electrodes 82 as illustrated in Figure 1.

Connected to the anode 76 of ignitron 75 is an anode 83 of an electronic tube 84 having a cathode 85 connected to the ignitor 78 of the ignitron 75, and having a control grid 86 connected to a parallel circuit comprising a resistor 87 and a capacitor 88. Connected between the control grid 86 and the cathode 85 of tube 84, there is a secondary winding 89 of a transformer 91, the primary of which is disposed across the main supply lines 1 and 2, with polarity opposite to that of the transformer 61. In series with the winding 89 is the secondary winding 92 of a transformer 93 having its primary in series with the anode 94 of an electronic tube 95. Tube 95 has a cathode 96 and a shield grid 97, and has a control grid 98 connected through a suitable resistor 99 to the secondary winding 101 of a transformer 102. The primary winding of the transformer 102 is connected between conductors 56 and 18 with opposite polarity to that of transformer 55.

Paralleling the tube 95 is a resistor 103 which is connected to the anode 104 of an electronic tube 105 having a shield grid 106 and a cathode 107, and also having a control grid 108 connected through a suitable resistor 109 to the secondary winding 111 of transformer 58. As may be seen from Figure 1, cathode 107 and shield grid 106 of tube 105 are connected to conductor 18, while one terminal of the secondary winding 111 of transformer 58 is connected to the conductor 6.

The resistor 103 has one terminal connected to a phase shifting circuit comprising a capacitor 112 in series with a variable resistor 113, these elements being connected across the secondary winding 114 of a transformer 115, the primary winding of which is energized across the main supply lines 1 and 2. As may be seen from Figure 1, the mid-tap of the winding 114 is connected by means of a conductor 116 to the conductor 18, while conductor 56 is connected to the junction between capacitor 112 and resistor 113.

To the conductor 6 there is connected one terminal of a secondary winding 117 of the transformer 59, winding 117 being connected through a suitable resistor 118 to the control grid 119 of an electronic tube 121. Tube 121 has an anode 122 connected to the conductor 12, and has a cathode 123 connected to a timing circuit comprising a capacitor 124 paralleled by a variable resistor 125. This timing circuit is connected by means of a conductor 126 to a point intermediate two resistors 127 and 128 which are serially connected between the conductor 12 and the conductor 18. The junction point between capacitor 124 and resistor 125 is connected to the control grid 129 of an electronic tube 131 having a cathode 132 and a shield grid 133 connected to conductor 18, and having an anode 134 connected through a resistor 135 to the conductor 5. Anode 134 of tube 131 is also connected to a resistor 136, which is in turn connected to the control grid 137 of an electronic tube 138 having an anode 139 connected to conductor 12, and a cathode 141 connected to a capacitor 142. Also connected to the capacitor 142 is one end of a resistor 140, the other end of which is electrically connected to the conductor 18.

Capacitor 142 is connected to the control grid 143 of an electronic tube 144 having an anode 145, a cathode 146 and a shield grid 147. The cathode 146 is connected to the conductor 18, and the shield grid 147 is connected to the conductor 18 through a capacitor 148. Control grid 143 is connected to the conductor 12 through a resistor 149, and interposed between control grid 143 and conductor 18 is a capacitor 151. A resistor 162 is disposed between control grid 143 and shield grid 147. To anode 145 there is connected an electromagnetic coil 152, paralleled by a capacitor 153, a second capacitor 154 interconnecting anode 145 of tube 144 and shield grid 147 thereof. The tube 144 is connected across a transformer 155 having a primary winding thereof disposed across the main supply lines 1 and 2, and having a secondary winding 156 which is connected between the anode and cathode of tube 144 through an initiating contact 157. A normally open contact 158 is disposed in parallel with the initiating contact 157.

There is also connected across the main supply lines 1 and 2 a valve solenoid 159 which controls the movement of the welding electrodes 82 in conventional manner, solenoid 159 being connected across the main supply lines 1 and 2 through a normally open switch 161.

In the foregoing description of the circuit, it will be noted that certain conventional elements such as grid resistors, surge by-pass capacitors, water flow switches, fuses, etc. have been eliminated to simplify the explanation of the circuit and its operation. These elements are well known to those skilled in the art, and the value of such components and their disposition will be obvious to these persons.

As an example of but one group of components useful in the control circuit of the present invention, the components shown in Figure 1 may have the following characteristics:

Tubes:
    72 and 75_____ Ignitrons.
    48, 95, 25, 37, 105, 131, 144_____ 2050.
    13_____ ODS/VR150.
    121, 138_____ 6J5.
    64, 84_____ C3J.

Resistors (in ohms):
    9_____ 470, 1 watt.
    14, 46, 103_____ 5 K, 10 w.
    15_____ 680K, nominal 1 w.
    16_____ 100K, 1 w.
    17_____ 9K, 10 w.
    23, 125_____ 2M.
    31_____ 18K.
    32_____ 450K.
    30_____ 15M, 1 w.
    60_____ 30K, 1 w.
    70, 128, 140_____ 220K, 1 w.
    44_____ 180K, 1 w.
    45_____ 180K, nominal 1 w.
    57, 99_____ 100K, 1 w.
    68, 87_____ 470K, 1 w.
    109_____ 680K, 1 w.
    110_____ 10M, 1 w.
    113_____ 16K, 50 w.
    127_____ 3.3M, nominal 1 w.
    118, 136_____ 560K, 1 w.
    135_____ 47K, 2 w.
    149_____ 10K, 1 w.
    162_____ 270K, 1 w.

Capacitors (in mfd.):
    8, 11_____ 16, 450 v. D. C.
    22_____ 0.5, 600 v. D. C.
    33_____ 2, 230 v. A. C.
    40_____ 0.0047, 500 v. D. C.
    90_____ 0.002, 500 v. D. C.
    80, 100_____ 0.0005, 500 v. D. C.
    69, 88_____ 0.25, 600 v. D. C.
    112_____ 0.5, 600 v. D. C.
    124_____ 0.2, 600 v. D. C.
    142, 151_____ 0.05, 600 v. D. C.
    148, 154_____ 0.01, 600 v. D. C.
    153_____ 8, 115 v. A. C.

Rectifier: 7_____ (3) 75 ma., 115 v. A. C.

As may be seen from Figure 1, electromagnetic coil 152 controls the operation of contacts 161, 21, 29, 34 and 158. These contacts are so disposed that the normally closed contacts open before the normally open contacts close.

When the main supply lines 1 and 2 are connected to a source of electrical energy, and prior to the operation of initiating switch 157, an alternating voltage appears between lines 1 and 2 which supplies transformers 3, 42, 61, 91 and 115 with electrical energy. Rectifier 7 cooperates with a secondary winding 4 of transformer 3 to place a pulsating D. C. voltage between the conductors 5 and 6, while tube 13 ensures a steady D. C. voltage between the conductors 12 and 18. Current flows from line 12 through the normally closed contact 21 to charge capacitor 22 by control grid 24 conduction of tube 25. Tube 25 cannot conduct as the contact 29 in its anode circuit is open. Contact 34 is closed thereby preventing any charge from building up on capacitor 33.

Upon operation of initiating switch 157, secondary winding 156 of transformer 155 supplies current through the initiating switch to tube 144. The control grid 143 of tube 144 has applied thereto a sufficient positive potential, through resistor 149, so that tube 144 will begin to conduct. Conduction of tube 144 effects passage of current through coil 152 whereby the contacts controlled thereby are operated. As previously indicated, the normally closed contacts 21 and 34 will open before the normally open contacts 161, 29 and 158 close. As contact 21 is opened, the control grid 24 of tube 25 falls to a substantially negative voltage, relative to cathode 26, due to the charge on capacitor 22. The opening of contact 34 eliminates the short circuit from around capacitor 33. Then the normally open contacts will close, closure of contact 161 effecting the passage of current through the valve solenoid 159 whereby the application of pressure to the welding electrodes 82 is initiated; contact 29 closes to complete the anode circuit of tube 25; contact 158 closes to effect a non-beat holding circuit around the initiating contact 157.

When the charge on capacitor 22 is sufficiently dissipated, through the adjustable resistor 23, resistor 30 and capacitor 40 apply a synchronizing pulse of voltage to the shield grid 27 of tube 25 which renders tube 25 conducting. In the above discussion relative to the initiation of conduction of tube 25, it has been assumed that the contacts 19 of the conventional pressure switch have closed. If such is not the case, that is to say, if insufficient pressure has been built up by the welding electrodes to effect closure of the contacts 19 of the conventional pressure switch, the voltage between the cathode 26 and the control grid 24 of tube 25 is always such that the tube 25 will not begin to conduct.

Prior to conduction of tube 25, the cathode 36 of tube 37 is always sufficiently positive relative to the control grid 41 of that tube to prevent its conduction. Upon conduction of tube 25, however, the voltage of cathode 36 falls sufficiently so that the voltage of control grid 41 is positive relative to the cathode voltage. The value of resistor 110 is sufficiently high to minimize grid current flow. The secondary winding 43 of transformer 42 applies anode voltage to the tube 37, and windings 43 and 50 of transformer 42 are serially connected through capacitor 90 and resistor 60. This is, in effect, a phase shifting divider network which supplies a synchronizing voltage to the shield grid 39 of the tube 37 through resistor 70 and capacitor 80. Tube 37 will thereby conduct only full half cycles of current.

When tube 37 conducts, current flows through resistor 46 and through the primary windings of transformers 58 and 59. The duration of tube 37 conduction is determined by the rate at which capacitor 33 is charged by tube 25 conduction. This rate is dependent upon the setting of variable resistor 32. When the charge on capacitor 33 is sufficiently great, the cathode 36 of tube 37 will become sufficiently positive to prevent further conduction through that tube, until the charge on capacitor 33 is dissipated at the end of a welding cycle.

The passage of current through resistor 46 effects the application of anode voltage to tube 48. As may be seen from Figure 1, the phase shifting circuit comprising transformer 115, capacitor 112 and resistor 113 energizes the primary windings of transformers 55 and 102, these transformers being of opposite polarity. As the secondary winding 54 of transformer 55 goes positive, at an instant determined by the setting of the phase shifting circuit during a half cycle in which current flows through resistor 46, tube 48 is rendered conducting. Conduction of tube 48 effects the energization of transformer 47, the secondary winding 63 of which is in the grid circuit of tube 64.

Prior to the energization of transformer 47, the secondary winding 62 of transformer 61 effected grid current flow through the parallel circuit comprising resistor 68 and capacitor 69 during those instants in which the anode 65 of tube 64 was negative. During positive excursions of the anode 65 voltage, the charge on capacitor 69 held the control grid 67 of tube 64 negative whereby tube 64 could not conduct. The value of resistor 68 is such that the charge on capacitor 69 was dissipated during the half cycle following that in which the charge accumulated.

The voltage wave forms at the anode and control grid of tubes 48 and 64 are shown in Figure 2, which illustrates these voltage wave forms for a one cycle weld. As may be seen therein, the instant at which the control grid 53 of tube 48 goes positive is determined by the phase shift circuit comprising the resistor 113 and the capacitor 112. The anode voltage for tube 48, supplied by the voltage drop across resistor 46, is applied prior to the instant at which the grid 53 is driven positive by the secondary winding 54 of transformer 55. When tube 48 starts to conduct, the passage of current through the primary winding of transformer 47 energizes the secondary winding 63 of this transformer, which energization drives the control grid 67 of tube 64 positive and maintains this positive condition for a substantial portion of a half cycle. The consequent conduction of tube 64 effects the passage of current through the ignitor 74 of ignitron 72 whereby current flows through the ignitron 72 and the associated welding transformer 79. The secondary winding 81 of the welding transformer thereby supplies current through the welding electrodes 82.

As the tube 37 conducts, as previously indicated, current flows through the primary winding of transformer 58. Prior to energization of this transformer, the tube 105 does not conduct as the control grid 108 thereof is at a potential below that of the cathode 107, as the control grid 108 is connected to the negative voltage conductor 6 through the resistor 109 and the secondary winding 111. As may be seen from Figure 1, the anode voltage supply to the tube 105 is of opposite polarity to that supplied to the tube 37. Upon conduction of the tube 37, and the consequent energization of transformer 58, the secondary winding 111 of transformer 58 supplies a positive voltage to the control grid 108 of the tube 105 so that when the anode 104 goes positive, tube 105 will conduct a full half cycle of current. Passage of current through tube 105 creates a voltage drop across resistor 103 in series with the tube, this voltage drop being applied between anode 94 and cathode 96 of the tube 95. At an instant determined by the phase shifting circuit, the secondary winding 101 of transformer 102 drives the control grid 98 of tube 95 positive so that tube 95 will conduct current and energize the primary winding of transformer 93. As may be seen from Figure 3, in which the voltage wave forms in this portion of the circuit are illustrated for a one cycle weld, the pulse of current through the secondary winding 92 of transformer 93 overcomes the normal hold-off voltage supplied to the control grid 86 of the tube 84 (by means of the transformer 91 and the parallel circuit including the resistor 87 and capacitor 88). As Figure 3 illustrates, the control grid 86 is driven positive by the secondary winding 92, and maintained positive for a substantial portion of a half cycle. During this half cycle, tube 84 will therefore conduct current through the ignitor 78 of the ignitron 75, which will conduct current to energize the associated welding transformer 79.

Prior to the conduction of tube 37, the tube 131 conducts pulses of current supplied through the conductor 5 and the resistor 135. When tube 37 conducts, however, the primary winding of transformer 59 is energized, so that the secondary winding 117 thereof applies pulses of positive voltage to the control grid 119 of the tube 121. Current flow through tube 121 charges capacitor 124, connected to the control grid 129 of the tube 131. When tube 121 is cut off, due to the deenergization of transformer 59, the grid 129 of tube 131 is negative with respect to the cathode 132 of this grid due to the charge on capacitor 124. Tube 131 cannot, therefore, conduct until the charge on capacitor 124 is discharged through the adjustable resistor 125 associated therewith. After this charge has been suitably dissipated, tube 131 once again returns to the conduction of pulses of current supplied through the conductor 5.

During conducting periods of the tube 131, the voltage drop across resistor 135 places a negative voltage on the control grid 137 of the tube 138 so that this tube cannot conduct. However, when tube 131 is cut off, the control grid 137 of tube 138 receives positive pulsations of voltage whereby tube 138 will conduct to charge the capacitor 142 connected to the control grid 143 of the tube 144. As will be seen from Figure 1, between the pulsations of current flow through 138 the charge on capacitor 142 makes the control grid 143 of tube 144 negative with respect to the cathode 146 of that tube. These periods between the pulsations occur, however, when the anode 145 of the tube 144 is negative so that conduction of the tube 144 is not affected. However, when tube 131 again conducts, that is to say after the charge on capacitor 124 has been dissipated, the conduction of tube 138 cannot occur during those half cycles in which the anode 145 of tube 144 is positive with respect to the cathode of that tube, due to the charge on capacitor 142. The grid 143 of tube 144, therefore, assumes a potential negative to that of the cathode 146, and tube 144 is cut off. Deenergization of tube 144 stops the passage of current through the electromagnetic coil 152 and the contacts controlled thereby return to the position in Figure 1.

Opening of contact 161 deenergizes valve solenoid 159, so that pressure is removed from the welder electrode 82. (The contacts 19 of the pressure switch will therefore return to the position of Figure 1.) Closure of contact 21 completes the charging circuit for capacitor 22, and opening of contact 29 breaks the anode circuit of tube 25. When contact 34 closes, capacitor 33 is short-circuited and the charge thereon disappears. The opening of contact 158 breaks the holding circuit around initiating contact 157.

If the initiating switch 157 was closed only momentarily at the initiation of the welding cycle, the charge on capacitor 142 rapidly bleeds off, thereby permitting tube 144 to conduct for the next welding cycle as soon as the initiating switch 157 is again closed.

If the initiating contact 157 is held closed following the deenergization of tube 144, the shield grid 147 functions as a half wave rectifier permitting a charge, supplied by secondary winding 156 through switch 157, to build up on capacitor 154. The magnitude of this charge is determined by the relative values of capacitors 154 and 148, this charge being reestablished during every positive excursion of the anode voltage. The charge on capacitor 154 appears as a D. C. voltage on the control grid 143 of tube 144 maintaining this grid at a sufficiently negative voltage to prevent the tube 144 from conducting. Upon release of the initiating switch 157, this charge on capacitor 154, and the negative voltage on the control grid 143 of tube 144, is rapidly dissipated whereby the tube 144 is once again ready to conduct, and thereby initiate another welding cycle. This non-repeat circuit is described and claimed in the copending application of Ernest G. Anger and Robert C. Mierendorf, entitled Non-Repeat Control Circuit, Serial No. 148,192, filed March 7, 1950.

A consideration of the above description of the operation of the circuit illustrated in Figure 1 indicates that the ignitrons 72 and 75 are controlled by the control tubes 64 and 84 respectively. These control tubes are normally prevented from conducting, and normally carry a negative charge on the control grids thereof during those half cycles in which their anodes are positive. The control grid 67 of tube 64 is, however, driven positively for a substantial portion of a half cycle by the pulse from transformer 47 when the anode 65 thereof is positive. Similarly, the control grid 86 of the tube 84 has normally a negative voltage, but is driven positively for a substantial portion of a half cycle by a pulse from the transformer 93. The pulses through transformers 47 and 93 occur at instants determined by the setting of the phase shift circuit, comprising capacitors 112 and 113, which energizes the transformers 55 and 102. It will be seen that the width of the firing pulse supplied to the control tubes 64 and 84 is sufficiently broad so as to ensure that the ignitron which will start to conduct in response to conduction through the control tube will be rendered conducting with certainty. That is to say, the width of the firing pulse assures that the ignitor associated with the control tube will force the ignitron to fire even though it normally may be hard to start. This firing circuit reduces, therefore, the possibility of one polarity of half cycles of current in the welder transformer with resultant D. C. saturation and line disturbances.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit, a source of alternating voltage, a load, means for controlling the passage of current through said load, controlling means for initiating current flow through said last mentioned means comprising a first electronic tube having an anode and a cathode and a controlling electrode, conduction of said first tube effecting conduction of said last mentioned means, means for applying a potential to said controlling electrode of a nature to permit conduction of current by said first electronic tube, said applying means including a second electronic tube having a pair of principal electrodes and a control electrode and means energized thereby for maintaining said controlling electrode potential for a substantial portion of a half cycle of said alternating voltage, a third electronic tube, a resistor in series with said third electronic tube, means for initiating the conduction of said third electronic tube at the beginning of a half cycle of said alternating voltage whereby a voltage drop appears across said resistor, connections between said resistor and said second electronic tube whereby the voltage drop across said resistor is impressed across said principal electrodes of said second electronic tube, means for applying a firing voltage to said control electrode of said second electronic tube at a predetermined instant after the voltage drop appears across said principal electrodes so that said second electronic tube starts to conduct at a predetermined instant relative to said alternating voltage wave, connections between said means energized by said second electronic tube and said controlling electrode of said first electronic tube, whereby said controlling electrode of said first electronic tube is supplied with said potential at a synchronized instant and retains said potential thereafter for a substantial portion of a half cycle so that said first electronic tube will conduct to initiate current flow through said last mentioned means.

2. In a control circuit, a source of alternating voltage, a load, means for controlling the passage of current through said load, controlling means for initiating current flow through said last mentioned means comprising a first electronic tube having an anode and a cathode and a controlling electrode, conduction of said first tube effecting conduction of said last mentioned means, means for applying a potential to said controlling electrode of a nature to permit conduction of current by said first electronic tube, said applying means including a second electronic tube having a pair of principal electrodes and a control electrode and means energized thereby for maintaining said controlling electrode potential for a substantial portion of a half cycle of said alternating voltage, a third electronic tube, a resistor in series with said third electronic tube, means for initiating the conduction of said third electronic tube at the beginning of a half cycle of said alternating voltage whereby a voltage drop appears across said resistor, connections between said resistor and said second electronic tube whereby the voltage drop across said resistor is impressed across said principal electrodes of said second electronic tube, means for applying a firing voltage to said control electrode of said second electronic tube at a predetermined instant after the voltage drop appears across said principal electrodes so that said second electronic tube starts to conduct at a predetermined instant relative to said alternating voltage wave, connections between said means energized by said second electronic tube and said controlling electrode of said first electronic tube, whereby said controlling electrode of said first electronic tube is supplied with said potential at a synchronized instant and retains said potential thereafter for a substantial portion of a half cycle so that said first electronic tube will conduct to initiate current flow through said last mentioned means, and means for terminating the conduction of said third electronic tube after a predetermined period of conduction thereof whereby said second electronic tube is deenergized and said potential at said controlling electrode of said first electronic tube is eliminated and conduction thereof is terminated.

3. In a control circuit, a source of alternating voltage, a load, means for controlling the passage of current through said load, controlling means for initiating current flow through said last mentioned means comprising a first electronic tube having an anode and a cathode and a controlling electrode, conduction of said first tube effecting conduction of said last mentioned means, means for normally applying a negative voltage to said controlling electrode when the anode of said first tube is positive whereby conduction through said first electronic tube is prevented, means for applying a potential to said controlling electrode of a nature to permit conduction of current by said first electronic tube, said applying means including a second electronic tube having a pair of principal electrodes and a control electrode and means energized thereby for maintaining said controlling electrode potential for a substantial portion of a half cycle of said alternating voltage, a third electronic tube, a resistor in series with said third electronic tube, means for initiating the conduction of said third electronic tube at the beginning of a half cycle of said alternating voltage whereby a voltage drop appears across said resistor, connections between said resistor and said second electronic tube whereby the voltage drop across said resistor is impressed across said principal electrodes of said second electronic tube, means for applying a firing voltage to said control electrode of said second electronic tube at a predetermined instant after the voltage drop appears across said principal electrodes so that said second electronic tube starts to conduct at a predetermined instant relative to said alternating voltage wave, connections between said means energized by said second electronic tube and said controlling electrode of said first electronic tube, whereby said controlling electrode is supplied with said potential at a synchronized instant and retains said potential thereafter for a substantial portion of a half cycle so that said first electronic tube will conduct to initiate current flow through said last mentioned means, and means for terminating the conduction of said third electronic tube after a predetermined period of conduction thereof whereby said second electronic tube is deenergized and said potential of said controlling electrode of said first electronic tube is eliminated and conduction thereof is terminated.

4. In a control circuit, a source of alternating voltage, a pair of electric discharge means connected in inverse parallel across said source, each of said discharge means having control means associated therewith for initiating conduction of said discharge means, said control means comprising a first electronic tube having an anode and a cathode and a controlling electrode, means for normally applying a voltage to said controlling electrode which prevents conduction of said first electronic tube, a second electronic tube having a pair of principal electrodes and a control electrode, means energized by conduction of said second tube, connections between said last mentioned means and said controlling electrode whereby during energization of said last mentioned means there is applied to said controlling electrode a firing potential sufficient to effect conduction of said first electronic tube, means including a third electronic tube for applying a voltage between the principal electrodes of said second electronic tube for full half cycles of said alternating voltage and of a nature to render said second tube conductive, and means for applying a firing potential to the control electrode of said second electronic tube at a predetermined instant relative to said alternating voltage wave and during said full half cycles, whereby said second tube will conduct for predetermined portions of half cycles and said last mentioned means will apply said firing potential to said controlling electrode of said first electronic tube from said predetermined instant throughout the remainder of each of said full half cycles, said first electronic tube thereby being rendered conducting and initiating conduction of the associated electric discharge means.

5. The control circuit of claim 4 in which said means for applying a voltage between the principal electrodes of said second electronic tube comprises impedance means connected in parallel with the principal electrodes of said second electronic tube, a third electronic tube, connections between said third tube and said impedance means whereby conduction of said third tube creates a voltage drop across said impedance means, and means for effecting the conduction of said third electronic tube in full half cycles only.

6. The control circuit of claim 5 in which said electric discharge means comprise ignitrons, and in which the anode and cathode of said first electronic tubes are connected to the anode and ignitor, respectively, of said ignitrons whereby conduction of said first electronic tubes effect the initiation of conduction through said ignitrons.

References Cited in the file of this patent
UNITED STATES PATENTS

| | | |
|---|---|---|
| 2,443,660 | Large et al. | June 22, 1948 |
| 2,473,238 | Bivens | June 14, 1949 |
| 2,482,892 | Barwick | Sept. 27, 1949 |
| 2,564,500 | Poole | Aug. 14, 1951 |
| 2,577,411 | Faulk | Dec. 4, 1951 |
| 2,605,448 | Rockafellow | July 29, 1952 |